(12) United States Patent
Yomogida et al.

(10) Patent No.: US 8,149,424 B2
(45) Date of Patent: Apr. 3, 2012

(54) IMAGE PROCESSING DEVICE AND INFORMATION PROCESSING DEVICE

(75) Inventors: Yuichi Yomogida, Kanagawa (JP); Yoichi Utaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1146 days.

(21) Appl. No.: 12/000,381

(22) Filed: Dec. 12, 2007

(65) Prior Publication Data

US 2008/0158583 A1 Jul. 3, 2008

(30) Foreign Application Priority Data

Dec. 27, 2006 (JP) ................................ 2006-352519

(51) Int. Cl.
*G06F 3/12* (2006.01)
(52) U.S. Cl. ......... 358/1.1; 439/249; 439/278; 439/282; 439/31; 439/13; 439/142; 439/136; 439/135; 347/108; 347/111; 361/801; 361/802; 361/726; 361/759; 361/752; 361/679.02; 361/679.01; 361/679.4; 361/600
(58) Field of Classification Search ............... 361/679.4, 361/679.02, 679.01; 358/1.16, 1.1
See application file for complete search history.

(56) References Cited

U.S. PATENT DOCUMENTS

| | | | | |
|---|---|---|---|---|
| 6,550,910 B2* | 4/2003 | Hwang | ................. | 347/108 |
| 7,042,715 B2* | 5/2006 | Lin et al. | ................. | 361/679.4 |
| 7,123,487 B2* | 10/2006 | Saito et al. | ................. | 361/801 |
| 2002/0174286 A1 | 11/2002 | Tamura | | |
| 2006/0268310 A1* | 11/2006 | Tamai et al. | ................. | 358/1.14 |
| 2007/0058869 A1* | 3/2007 | Matsuzaka et al. | ........... | 382/190 |
| 2007/0132733 A1* | 6/2007 | Ram | ................. | 345/163 |

FOREIGN PATENT DOCUMENTS

| JP | 2001-357359 | 12/2001 |
|---|---|---|
| JP | 3100895 | 1/2004 |
| JP | 2004-356822 | 12/2004 |
| JP | 2007-110700 | 4/2007 |

OTHER PUBLICATIONS

Japanese Office Action dated Jan. 25, 2011.

* cited by examiner

*Primary Examiner* — Benny Tieu
*Assistant Examiner* — Paul F Payer
(74) *Attorney, Agent, or Firm* — Harness, Dickey & Pierce, P.L.C.

(57) ABSTRACT

A disclosed image processing device includes: a media connecting portion including a first surface and a second surface forming a space for housing a protrusion type storage medium whose body protrudes from the media connecting portion and an insertion type storage medium whose body is inserted into the media connecting portion; a protrusion type slot portion for protrusion type storage media formed on the first surface; and an insertion type slot portion for insertion type storage media formed on the second surface. An insertion direction in the protrusion type slot portion is substantially orthogonal to an insertion direction in the insertion type slot portion.

14 Claims, 12 Drawing Sheets

IMAGE PROCESSING DEVICE AND INFORMATION PROCESSING DEVICE

BACKGROUND OF THE INVENTION

1. Field of the Invention

The present invention relates to an image processing device and an information processing device.

2. Description of the Related Art

Conventionally, digital multi-function devices referred to as MFP (Multi Function Peripheral) have been supplied in which a copier function, facsimile (FAX) function, printer function, and scanner function are combined (refer to Patent Document 1, for example).

According to such digital multi-function devices, it is possible to computerize handwritten documents, paper materials, and the like and to share and utilize the computerized materials on a network. In other words, these digital multi-function devices are placed as terminals on the network.

Further, some of the above-mentioned digital multi-function devices include a reader/writer unit for removable memory media so as to exchange information with external devices. In recent years, the removable memory media have been frequently used as temporary storage media for digital cameras and the like. The removable memory media are often used not only for temporary saving but also for handing over of information due to convenience thereof.

Patent Document 1: Japanese Laid-Open Patent Application No. 2004-356822

However, when the reader/writher unit for removable memory media is disposed, there is a problem in that an area of an entire image processing device is increased. In particular, when the reader/writer unit is disposed on an operation unit or the like, it is necessary to downsize the reader/writer unit from a front face to a back face of the device in order to secure visibility of paper ejection.

SUMMARY OF THE INVENTION

It is a general object of the present invention to provide an improved and useful image processing device and an information processing device in which the above-mentioned problems are eliminated.

A more specific object of the present invention is to provide an image processing device and an information processing device that can save space of the entire device.

According to one aspect of the present invention, there is provided an image processing device comprising: a media connecting portion including a first surface and a second surface forming a space for housing a protrusion type storage medium whose body protrudes from the media connecting portion and an insertion type storage medium whose body is inserted into the media connecting portion; a protrusion type slot portion for protrusion type storage media formed on the first surface; and an insertion type slot portion for insertion type storage media formed on the second surface, wherein an insertion direction in the protrusion type slot portion is substantially orthogonal to an insertion direction in the insertion type slot portion. In accordance with this, it is possible to provide an image processing device saving space of the entire device.

In the image processing device according to the above-mentioned invention, the first surface may be substantially orthogonal to the second surface. In accordance with this, it is possible to provide an image processing device saving space of the entire device when the media connecting portion has two surfaces substantially orthogonal to each other, the two surfaces forming the space for housing a storage medium based on the USB standard and an insertion type storage medium.

The image processing device according to the above-mentioned invention may include: an operation unit having at least one of a display and an operation key, wherein the media connecting portion may be disposed on the operation unit. In accordance with this, it is possible to instruct data reading and writing using a storage medium at the operation unit, so that it is possible to improve operability for a user.

In the image processing device according to the above-mentioned invention, a protection cover for protecting the storage medium may be disposed on the media connecting portion. In accordance with this, it is possible to prevent removal of the storage medium during data reading and writing, for example. In other words, it is possible to secure safety of data and save space of the entire device.

The image processing device according to the above-mentioned invention may include: a lock mechanism for locking the protection cover. In accordance with this, it is possible to further improve the safety of data.

In the image processing device according to the above-mentioned invention, the operation unit may include a movable mechanism for allowing movement of the protrusion type slot portion. In accordance with this, it is possible to prevent a possibility that when an insertion type storage medium is inserted or removed, the insertion type storage medium may interfere with a storage medium based on the USB standard and to improve the operability for the user.

In the image processing device according to the above-mentioned invention, the movable mechanism may turn the protrusion type slot portion in upward and downward directions relative to a horizontal direction on the first surface as a rotation axis. In accordance with this, it is possible to prevent the possibility that when an insertion type storage medium is inserted or removed, the insertion type storage medium may interfere with a storage medium based on the USB standard and to improve the operability for the user.

In the image processing device according to the present invention, the movable mechanism may turn the protrusion type slot portion in a horizontal direction relative to a vertical direction on the first surface as a rotation axis. In accordance with this, it is possible to prevent the possibility that when an insertion type storage medium is inserted or removed, the insertion type storage medium may interfere with a storage medium based on the USB standard and to improve the operability for the user.

The image processing device according to the above-mentioned invention may include: an input unit inputting opening and closing instructions of the protection cover; a first control unit controlling opening and closing operations of the protection cover; and a second control unit controlling operations of the movable mechanism, wherein when an instruction to open the protection cover is input by the input unit, the first control unit may control the protection cover to be in an open status and the second control unit may control the protrusion type slot portion for protrusion type storage media to move to a position where insertion and removal of the protrusion type storage media are readily made. In accordance with this, the user is not required to be aware of operation of the movable mechanism upon opening of the protection cover, so that it is possible to further improve the operability for the user.

In the image processing device according to the above-mentioned invention, when an instruction to close the protection cover is input by the input unit, the second control unit may control the protrusion type slot portion for protrusion type storage media to be housed in the media connecting portion and the first control unit may control the protection cover to be in a closed status. In accordance with this, the user is not required to be aware of operation of the movable mechanism upon closing of the protection cover, so that it is possible to further improve the operability for the user.

According to another aspect of the present invention, there is provided an information processing device comprising: a media connecting portion including a first surface and a second surface forming a space for housing a protrusion type storage medium whose body protrudes from the media connecting portion and an insertion type storage medium whose body is inserted into the media connecting portion a protrusion type slot portion for protrusion type storage media formed on the first surface; and an insertion type slot portion for insertion type storage media formed on the second surface, wherein an insertion direction in the protrusion type slot portion is substantially orthogonal to an insertion direction in the insertion type slot portion. In accordance with this, it is possible to provide an information processing device saving space of the entire device.

According to the image processing device and the information processing device of the present invention, it is possible to save space of the entire device.

Other objects, features and advantage of the present invention will become more apparent from the following detailed description when read in conjunction with the accompanying drawings.

DETAILED DESCRIPTION OF THE PREFERRED EMBODIMENTS

In the following, embodiments of the present invention will be described with reference to the accompanying drawings.

First Embodiment (Outline of Device)

Figure 1:
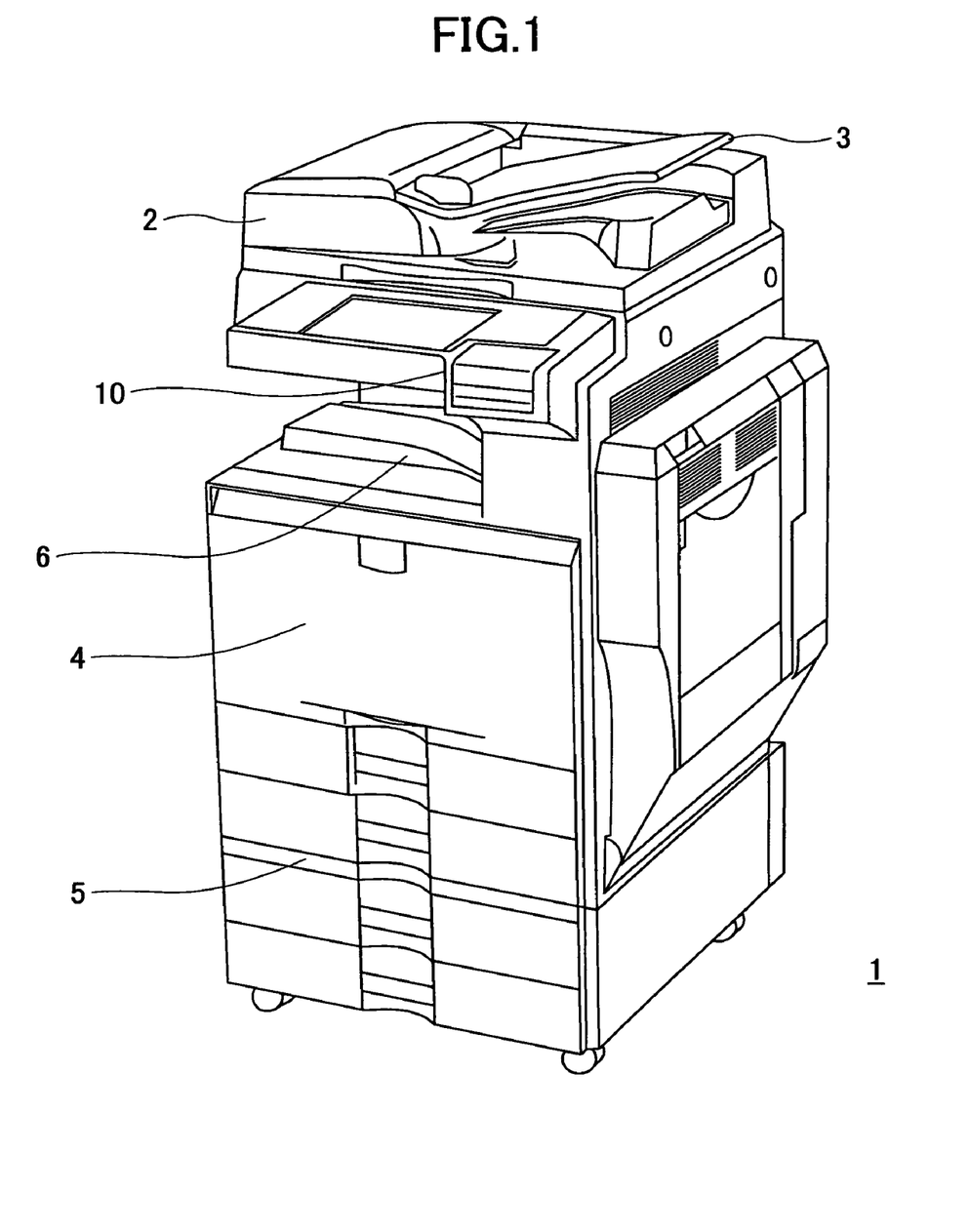
FIG. 1 is a diagram schematically showing an image processing device according to a first embodiment.

In the following, an outline of an image processing device according to a first embodiment of the present invention is described with reference to FIG. 1. FIG. 1 is a diagram schematically showing an image processing device according to the first embodiment. The image processing device shown in FIG. 1 is an MFP device in which a copier function, facsimile (FAX) function, printer function, and scanner function are combined. The image processing device is not limited to such an MFP device and may include other image processing device and image forming device.

In FIG. 1, an MFP (image processing device) 1 includes a scanner 2, document conveying unit 3, image forming unit 4, paper feed unit 5, paper ejection unit 6, operation unit 10, and the like.

The scanner 2 is a device reading a document placed on the document conveying unit 3 such as a contact glass, ADF (Auto Document Feeder), or the like as electronic data. The image forming unit 4 forms an image on paper for transfer by an electrophotographic process on the basis of the electronic data read by the scanner 2, the paper for transfer being conveyed from the paper feed unit 5 described later. The image forming unit 4 includes a photoconductor drum, charger, optical writer, development unit, transfer charger, fixing unit, and the like not shown in the drawings.

The paper feed unit 5 includes a mechanism conveying the paper for transfer loaded in a paper feed tray to the image forming unit 4 described later. The paper ejection unit 6 ejects copies of document conveyed from the image forming unit 4. The operation unit 10 includes keys, an indicator, and the like for allowing the user to input setting conditions and a start in a dialog system. Details of the operation unit 10 are described later with reference to FIGS. 2 to 12.

In accordance with the above-mentioned structure, in the image processing device 1, documents are read as electronic data in the scanner 2. Then, the image forming unit 4 forms an image on the paper for transfer on the basis of the electronic data read by the scanner 2, the paper for transfer being conveyed from the paper feed unit 5. The paper for transfer in which the image is formed, namely, the paper for transfer on which copying is performed is ejected by the paper ejection unit 6. The operation unit 10 is a man-machine interface for allowing the user to perform various types of setting and for displaying various types of information.

Further, in the image processing device 1 according to the first embodiment, when the user connects a storage medium (removable memory medium) such as a USB memory, SD card memory, and the like to a reader/writer unit for removable memory media of the image processing device 1, the reader/writer unit being not shown in the drawings, it is possible to perform an image process on the basis of data on images and the like stored in the storage medium.

In this case, the removable memory medium is used after being directly inserted into a connector of the reader/writer unit for removable memory media. Accordingly, while the user is physically capable of inserting or removing the removable memory medium at any time, data may be damaged or failure of operation of OS may be generated when the removable memory medium is removed during data access. In view of this, a concave portion which is used as a media connecting portion forming a space for housing the removable memory medium is disposed on the operation unit 10, for example, and the reader/writer unit for removable memory media is integrated with the operation unit 10, thereby downsizing the operation unit 10.

The following describes an example of a structure of the operation unit 10 when such a reader/writer unit for removable memory media is disposed on the operation unit 10 with reference to the drawings. A position where the reader/writer unit for removable memory media is disposed is not limited to the operation unit 10 but may include other portion. (Schematic structure of the operation unit 10)

Figure 2:
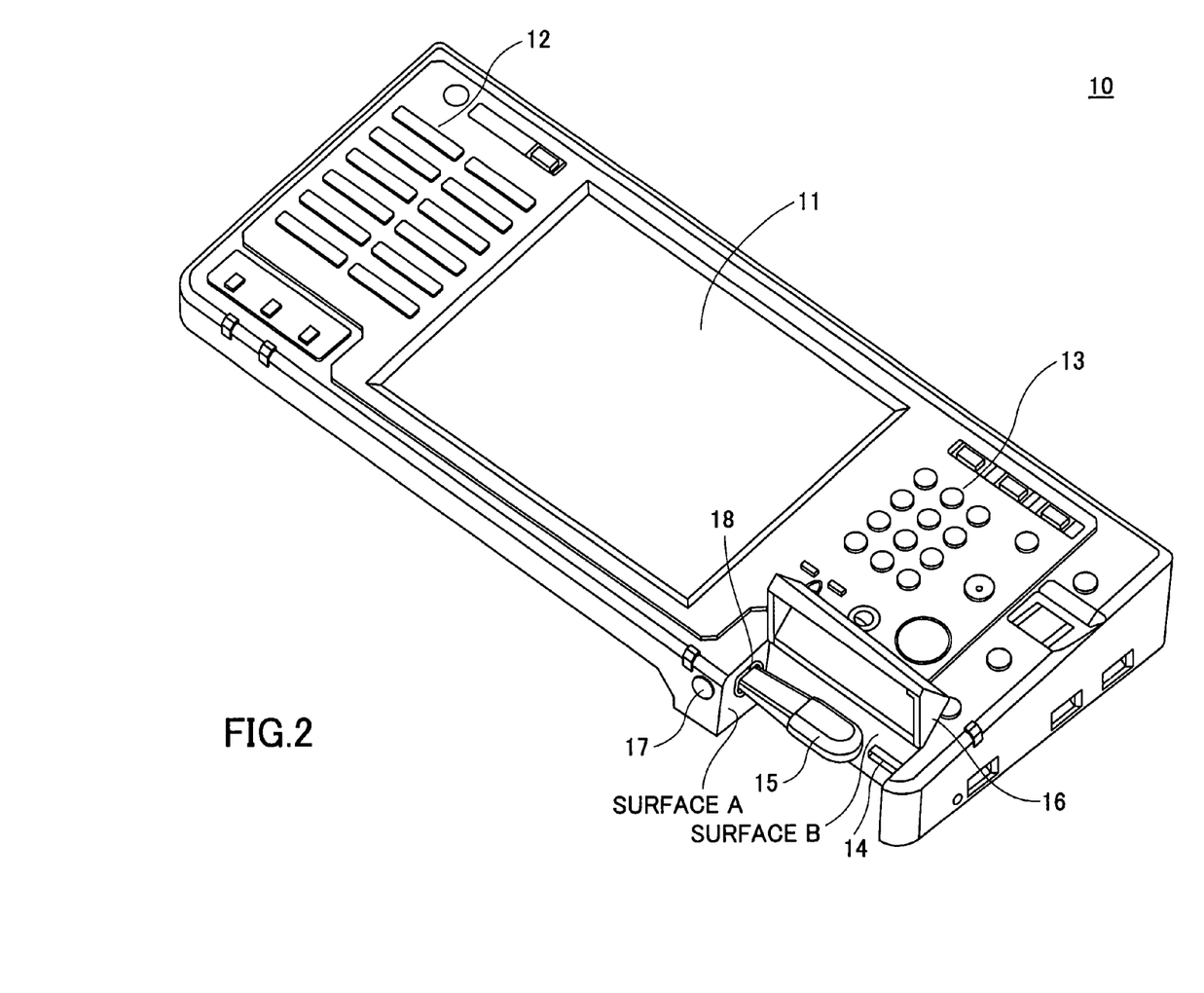
FIG. 2 is a diagram showing an example of a structure of an operation unit in an image processing device according to a first embodiment.

In the following, the example of the structure of the operation unit 10 in the image processing device according to the first embodiment is described with reference to FIG. 2. FIG. 2 is a diagram showing the example of the structure of the operation unit 10 in the image processing device according to the first embodiment.

In the image processing device according to the first embodiment, the concave portion is formed in font of operation keys 13 described later in the operation unit 10 shown in FIG. 2. The concave portion includes two surfaces (first surface A and second surface B substantially vertical relative to the drawing) forming a space. The concave portion forms the space for housing a storage medium based on the USB standard such as a USB memory, an insertion type storage medium (removable memory media) such as an SD card memory, and the like. A reader/writer unit 14 for removable memory media as a device for reading and writing data in the storage media is integrated with the operation unit 10. Details of structure are described in the following.

In FIG. 2, the operation unit 10 includes an operation panel 11, application keys 12, operation keys 13, reader/writer unit 14 for removable memory media, cover 16, cover open button 17, and the like.

The operation panel 11 is a touch panel display allowing the user to perform various types of setting and displaying various types of information. The application keys 12 are for switching functions among a copier function, printer function, scanner function, and the like. The operation keys 13 include a numeric keypad for specifying a number of copies to be printed, reset key for resetting printing, start key for instructing a print start, and the like.

The reader/writer unit 14 for removable memory media is a device for reading and writing data in removable memory media such as an SD card memory, USB memory, and the like. In FIG. 2, only a slot portion into which a removable memory medium is inserted is shown. The cover 16 is a protection cover for protecting storage media such as a USB memory 15 and the like. The cover open button 17 is for opening and closing the cover 16.

In accordance with the above-mentioned structure of the device, in the operation unit 10 according to the first embodiment, the concave portion is formed in front of the operation keys 13. The concave portion includes the two surfaces A and B forming a space. Further, the concave portion forms the space for housing a storage medium based on the USB standard such as a USB memory, an insertion type storage medium such as an SD card memory, and the like.

As shown in FIG. 2, the reader/writer unit 14 for removable memory media functioning as a device for reading and writing data in removable memory media such as the USB memory 15, SD card memory, and the like is integrated with the operation unit 10 and the slot portion (insertion portion) for removable memory media is housed in the concave portion of the operation unit 10.

In accordance with this, the operation unit 10 per se is downsized. In other words, it is possible to prevent enlargement of the area of the entire image processing device 1 resulting from the reader/writer unit 14 for removable memory media disposed thereon and to downsize the entire device. Moreover, it is possible to read and write data in accordance with various operations using the operation panel 11, operation keys 13, and the like and the storage media at the operation unit 10, so that the operability for the user is improved.

Further, in the concave portion, the cover 16 for protecting the storage media is disposed, so that it is possible to prevent removal of the removable memory medium such as the SD card memory, USB memory 15, and the like during data reading and writing using the reader/writer unit 14 for removable memory media, for example. In other words, safety of data in the removable memory medium is secured.

As shown in FIG. 2, a USB memory slot portion 18 installed on the operation unit 10 is disposed in a lateral manner in the cover 16. In this case, when a direction from the front face to the back face of the image processing device 1 is defined as a lengthwise direction, the expression "lateral manner" indicates a direction perpendicular to the lengthwise direction. In accordance with this, even when the USB memory 15 has a large size, the USB memory 15 is housed within the space (cover 16) of the concave portion of the operation unit 10 and the downsizing of the operation unit 10 is possible. In addition, the "lateral manner" is not limited to the above-mentioned case but may include directions perpendicular to a lengthwise direction defined as a direction from a left side surface to a right side surface of the image processing device 1.

Moreover, the USB memory slot portion 18 is formed on the surface A as the slot portion for the USB memory 15 and the insertion type slot portion 14 is formed on the surface B as the slot portion for the insertion type storage medium such as the SD card memory. An insertion direction in the USB memory slot portion 18 is orthogonal or substantially orthogonal to an insertion direction in the insertion type slot portion 14, so that the following effects are provided.

Specifically, regarding media in which an I/F connector portion is standardized while an entire shape is not standardized as in the USB memory 15, even when the medium has a large shape, it is possible to house the medium inside the space of the concave portion in the operation unit 10 (cover 16 can be closed), secure the safety of data, and utilize the entire portion of the image processing device 1.

As mentioned above, in the operation unit 10 of the image processing device 1 according to the first embodiment, by utilizing the space for housing a storage medium based on the USB standard such as the USB memory 15, an insertion type storage medium such as the SD card memory, and the like, it is possible to save space of the entire image processing device.

In addition, in the first embodiment, the concave portion is described as the two surfaces A and B forming the space. However, the concave portion is not limited to this as long as it forms a space for housing a storage medium based on the USB standard such as the USB memory, an insertion type storage medium (removable memory media) such as the SD card memory, and the like. Further, the space may be intended for purposes other than storing the storage medium.

In the first embodiment, the first surface A and the second surface B are configured to be substantially vertical relative to the drawing in the concave portion. However, the configuration of the first surface A and the second surface B is not limited to this as long as the surface A and the surface B are orthogonal or substantially orthogonal to each other. In accordance with this, in the image processing device, when the concave portion has two surfaces orthogonal or substantially orthogonal to each other, the two surfaces forming the space for housing a storage medium based on the USB standard, an insertion type storage medium, and the like, it is possible to save space of the entire image processing device.

Further, a lock mechanism using solenoid, for example, may lock the cover 16 during data access with the removable memory medium so as to prevent unintended removal of the removable memory medium and improve the safety of data. The lock mechanism may employ well-known techniques.

Second Embodiment

Figure 3:
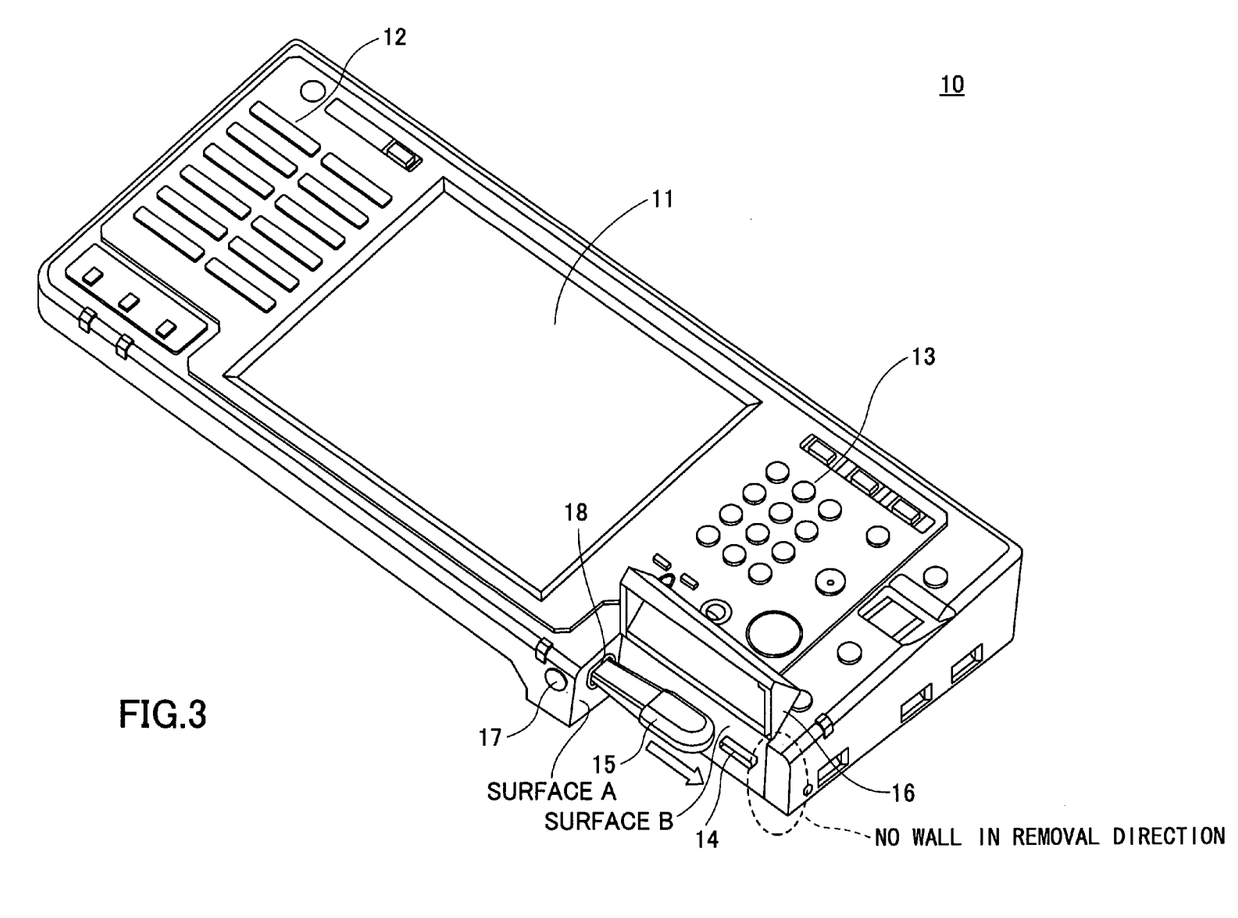
FIG. 3 is a diagram showing an example of a structure of an operation unit in an image processing device according to a second embodiment.

In the following, an image processing device according to a second embodiment is described with reference to FIG. 3. An outline of the image processing device according to the second embodiment is the same as in the first embodiment, so that description thereof is omitted.

(Schematic Structure of the Operation Unit 10)

In the following, an example of the structure of the operation unit 10 in the image processing device according to the second embodiment is described with reference to FIG. 3. FIG. 3 is a diagram showing the example of the structure of the operation unit 10 in the image processing device according to the second embodiment.

In the image processing device according to the above-mentioned first embodiment, the concave portion including the two surfaces A and B in the operation unit 10 are formed as shown in FIG. 2. In the present embodiment, a wall in an insertion and removal direction for a USB memory is eliminated as shown in FIG. 3.

In accordance with such a shape, the following effects are provided in addition to those of the first embodiment. Specifically, since the USB memory slot portion 18 is disposed in a lateral manner, there is a problem in that the wall (surface facing the slot portion) in the removal (insertion) direction blocks insertion or removal of the USB memory depending on a size thereof when the USB memory is inserted or removed. However, by employing the above-mentioned shape, it is possible to solve this problem and improve the operability for the user without blocking upon insertion or removal of the USB memory.

In the second embodiment, although the wall in the insertion and removal direction for the USB memory is eliminated, the shape of the concave portion is not limited to the cases of the second embodiment and the first embodiment. The shape of the concave portion may have other shapes so as to improve the operability for the user, utilize the space, and the like.

Third Embodiment

In the following, an image processing device according to a third embodiment is described with reference to FIGS. 4 to 6. In the above-mentioned first and second embodiments, the insertion direction in the USB memory slot portion 18 is orthogonal or substantially orthogonal to the insertion direction in the insertion type slot portion 14, so that it is possible to utilize the space resulting from downsizing of the operation unit 10.

In this case, when an insertion type storage medium such the SD card memory is inserted or removed, the insertion type storage medium may interfere with the USB memory, so that the USB memory may be required to be removed, for example. In the following description, the present embodiment is intended to solve the above-mentioned problem and improve the operability for the user by configuring the USB memory slot portion to be movable. In addition, an outline of the image processing device according to the third embodiment is the same as in the first embodiment, so that description thereof is omitted.

(Schematic Structure of the Operation Unit 10)

In the following, an example of the structure of the operation unit 10 in the image processing device according to the third embodiment is described with reference to FIGS. 4 to 6. FIG. 4 is a diagram showing the example of the structure of the operation unit 10 in the image processing device according to the third embodiment. FIG. 5 is a diagram showing an example of a movable mechanism in the image processing device according to the third embodiment. And, FIG. 6 is a diagram showing an example of operation of the movable mechanism in the image processing device according to the third embodiment.

Figure 4:
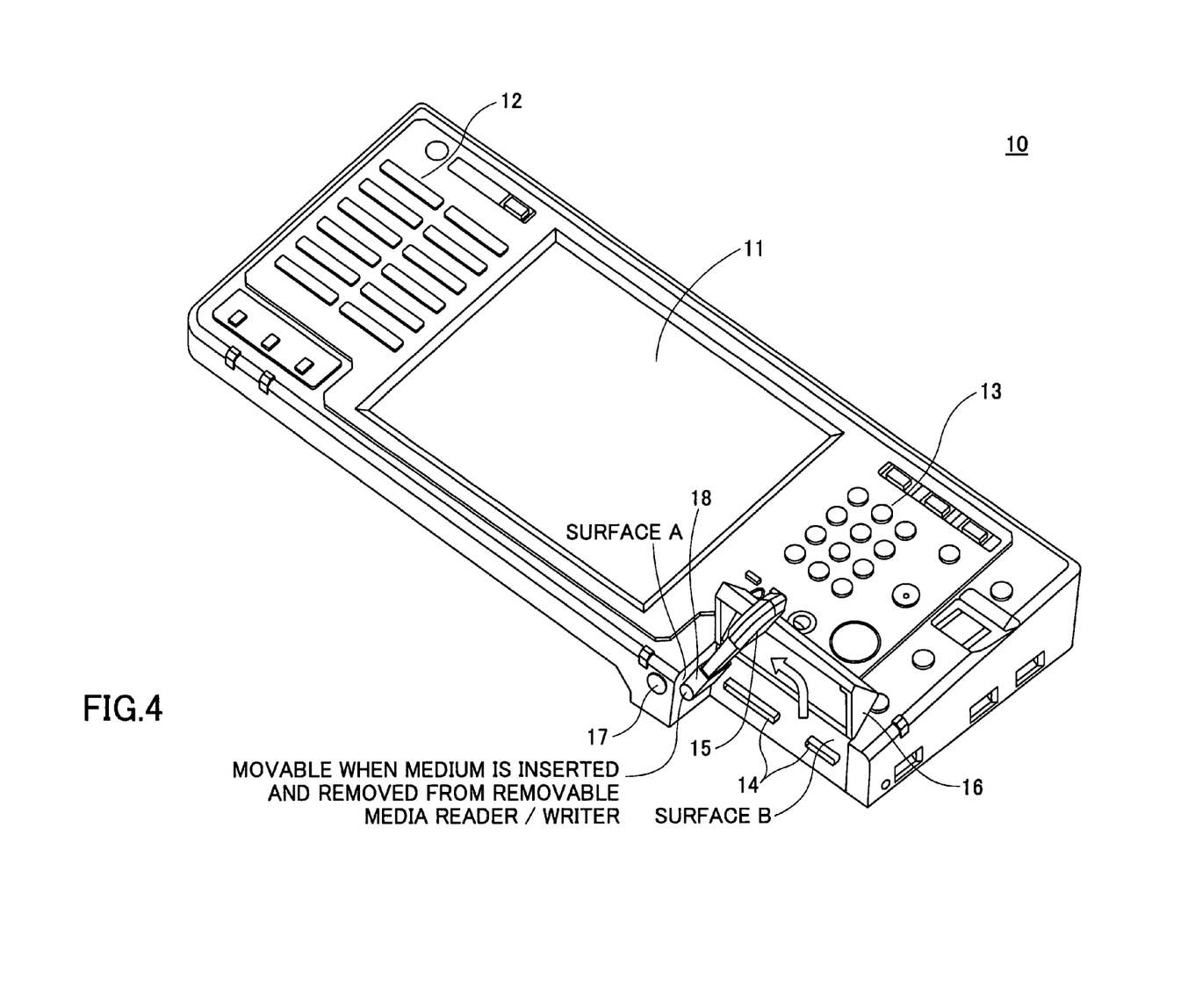
FIG. 4 is a diagram showing an example of a structure of an operation unit in an image processing device according to a third embodiment.

The structure of the operation unit 10 shown in FIG. 4 is the same as the structure shown in FIG. 2 except the USB memory slot portion 18, so that description thereof is omitted. In the present embodiment, the operation unit 10 includes the movable mechanism for allowing movement of the USB memory slot portion 18. In accordance with this, as shown in FIG. 4, the USB memory slot portion 18 is capable of turning in a direction indicated by an arrow in the drawing. In the following, details of the example of the movable mechanism are described with reference to FIG. 5.

Figure 5:
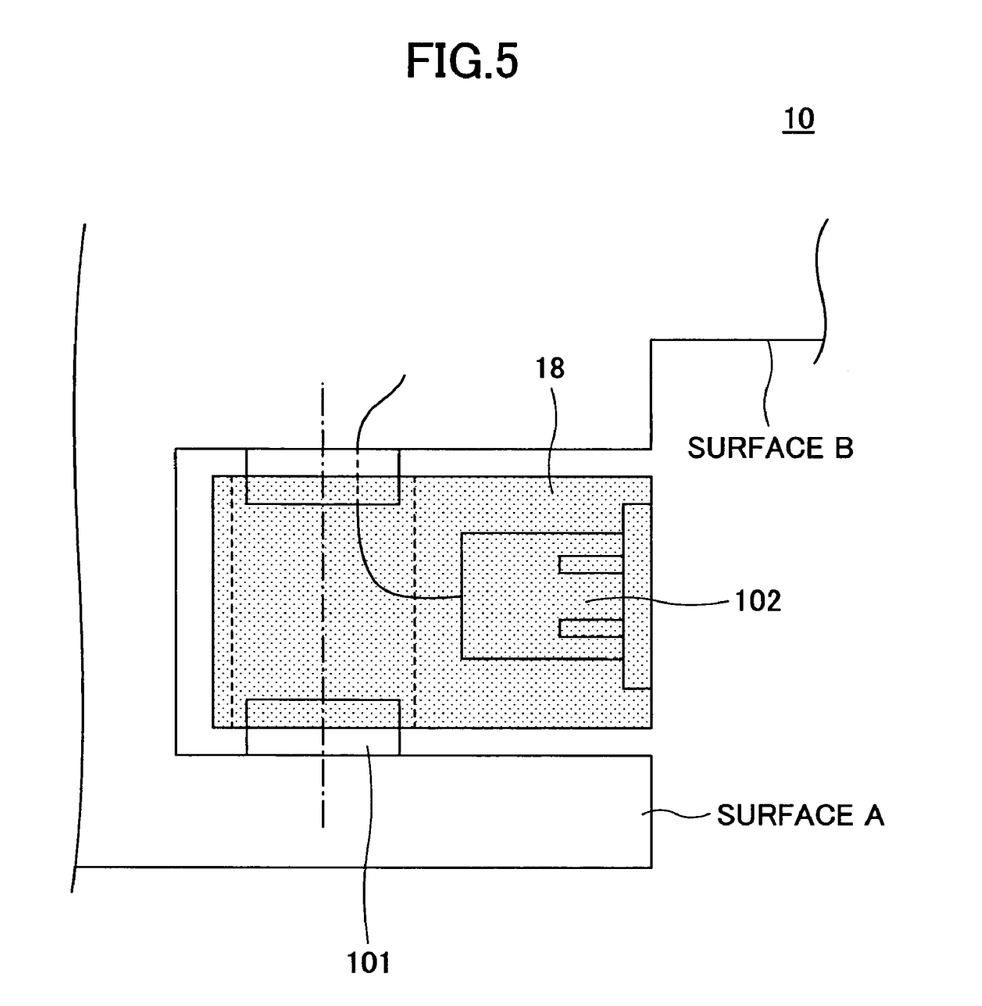
FIG. 5 is a diagram showing an example of a movable mechanism in an image processing device according to a third embodiment.

FIG. 5 shows the example of the movable mechanism when the operation unit 10 in FIG. 4 is viewed from above the image processing device 1. In FIG. 5, a space for housing the USB memory slot portion 18 is formed in the operation unit 10. Further, in the operation unit 10, a circular movement supporting portion 101 allowing movement of the USB memory slot portion 18 is disposed. The movement supporting portion 101 forms a cavity and is capable of allowing a cable and the like from a USB memory connector 102 to pass therethrough.

The USB memory connector 102 is a slot portion into which the USB memory 15 is inserted and is mounted so as to be supported by the movement supporting portion 101.

In accordance with the above-mentioned movable mechanism, the USB memory slot portion 18 is movable by rotating on a central axis of movement (dotted line in the drawing) formed in the movement supporting portion 101. Accordingly, when an insertion type storage medium is to be inserted or removed, the USB memory slot portion 18 is escaped as shown in FIG. 4 and the insertion type storage medium is inserted or removed. When the USB memory 15 is to be housed, by moving the USB memory slot portion 18 as shown in FIG. 6, it is possible to house the USB memory 15.

By configuring the USB memory slot portion 18 to be movable in this manner, it is possible to eliminate blocking of insertion or removal of other removable memory medium disposed in the same space. In other words, it is possible to improve the operability for the user. For example, when the insertion type storage medium such as the SD card memory or the like is inserted or removed, the insertion type storage medium may interfere with the USB memory, so that the USB memory may be required to be removed, for example. However, it is possible to solve this problem by configuring the USB memory slot portion 18 to be movable.

Further, by forming the cavity in the movement supporting portion 101, it is possible to electrically connect from a USB connector to a controller unit not shown in the drawings and mounted inside the operation unit 10.

In addition, in the third embodiment, as shown in FIG. 5, the space for housing the USB memory slot portion 18 is formed in the operation unit 10 and the movable mechanism for allowing the movement of the USB memory slot portion 18 in the space is disposed. However, a position of the movable mechanism is not limited to this. The above-mentioned movable mechanism may be formed in an external direction of the surface A, namely, on the concave portion.

Moreover, a range of application of the movable mechanism for allowing the movement of the USB memory slot portion 18 described in the third embodiment is not limited to the above-mentioned case. The movable mechanism may be disposed on a predetermined position other than the concave portion of the image processing device 1 or may be disposed on an image processing device where the insertion type slot portion 14 is not disposed. In both cases, the movable mechanism according to the present invention is disposed for the USB memory slot portion 18 and the USB memory slot portion 18 becomes movable, so that it is possible to readily insert the USB memory and improve the operability for the user.

Figure 6:
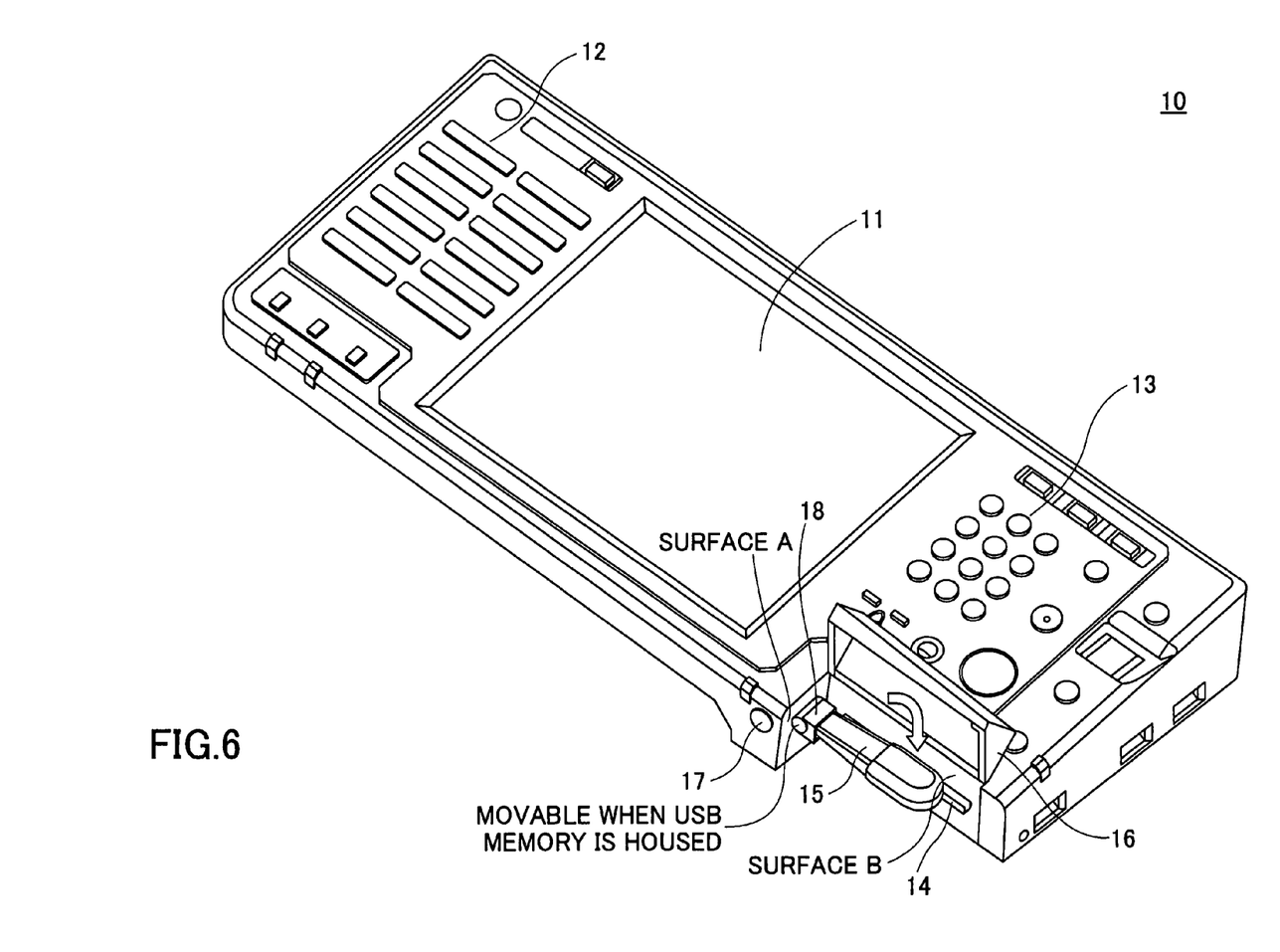
FIG. 6 is a diagram showing an example of operation of a movable mechanism in an image processing device according to a third embodiment.

Further, the movable mechanism shown in FIGS. 4 and 6 is for turning the USB memory slot portion 18 in upward and downward directions relative to a horizontal direction on the surface A of the image processing device 1 as a rotation axis (central axis of movement indicated by the dotted line in FIG. 5). However, the movable mechanism is not limited to this. Other embodiment is described in a fourth embodiment below.

Fourth Embodiment

In the following, an image processing device according to the fourth embodiment is described with reference to FIGS. 7 and 8. An outline of the image processing device according to the fourth embodiment is the same as in the first embodiment, so that description thereof is omitted. The movable mechanism according to the above-mentioned third embodiment is for turning the USB memory slot portion 18 in the upward and downward directions relative to the horizontal direction on the surface A of the image processing device 1 as the rotation axis. The present embodiment describes other mechanism, namely, a mechanism for turning the USB memory slot portion 18 in a horizontal direction relative to a vertical direction on the surface A as a rotation axis as shown in FIG. 7.

(Schematic Structure of the Operation Unit 10)

In the following, an example of the structure of the operation unit 10 in the image processing device according to the fourth embodiment is described with reference to FIGS. 7 and 8. FIG. 7 is a diagram showing the example of the structure of the operation unit 10 in the image processing device according to the fourth embodiment. FIG. 8 is a diagram showing an example of operation of a movable mechanism in the image processing device according to the fourth embodiment.

Figure 7:
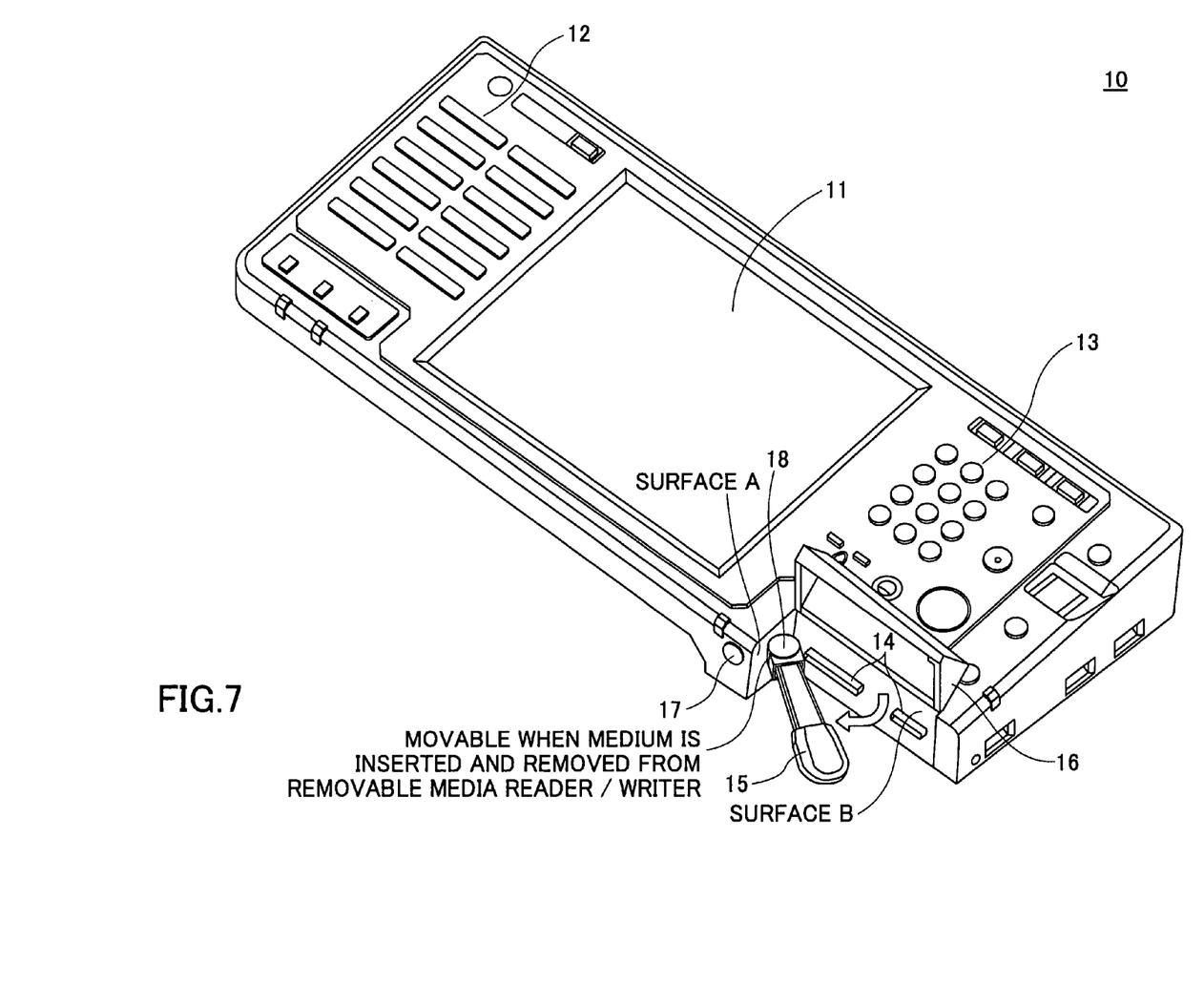
FIG. 7 is a diagram showing an example of a structure of an operation unit in an image processing device according to a fourth embodiment.

In FIG. 7, the operation unit 10 includes a movable mechanism for allowing the movement of the USB memory slot portion 18. In accordance with this, as shown in FIG. 7, the USB memory slot portion 18 is capable of turning in a direction indicated by an arrow in the drawing. In addition, the example of the structure of the movable mechanism is the same as in the above-mentioned third embodiment (refer to FIG. 5), so that description thereof is omitted.

In accordance with the above-mentioned movable mechanism, when an insertion type storage medium is to be inserted or removed, the USB memory slot portion 18 is escaped as shown in FIG. 7 and the insertion type storage medium is inserted or removed. When the USB memory 15 is to be housed, by moving the USB memory slot portion 18 as shown in FIG. 8, it is possible to house the USB memory 15.

By configuring the USB memory slot portion 18 to be movable in this manner, it is possible to improve the operability for the user so as not to block insertion or removal of other removable memory medium disposed in the same space. Further, when the movable mechanism according to the fourth embodiment is used, it is possible to further improve the operability for the user since the insertion and removal direction for the USB memory 15 is directed to a front side. In addition, the front side may be interpreted as a side where the user operating the image processing device stands on.

Fifth Embodiment

Figure 9:
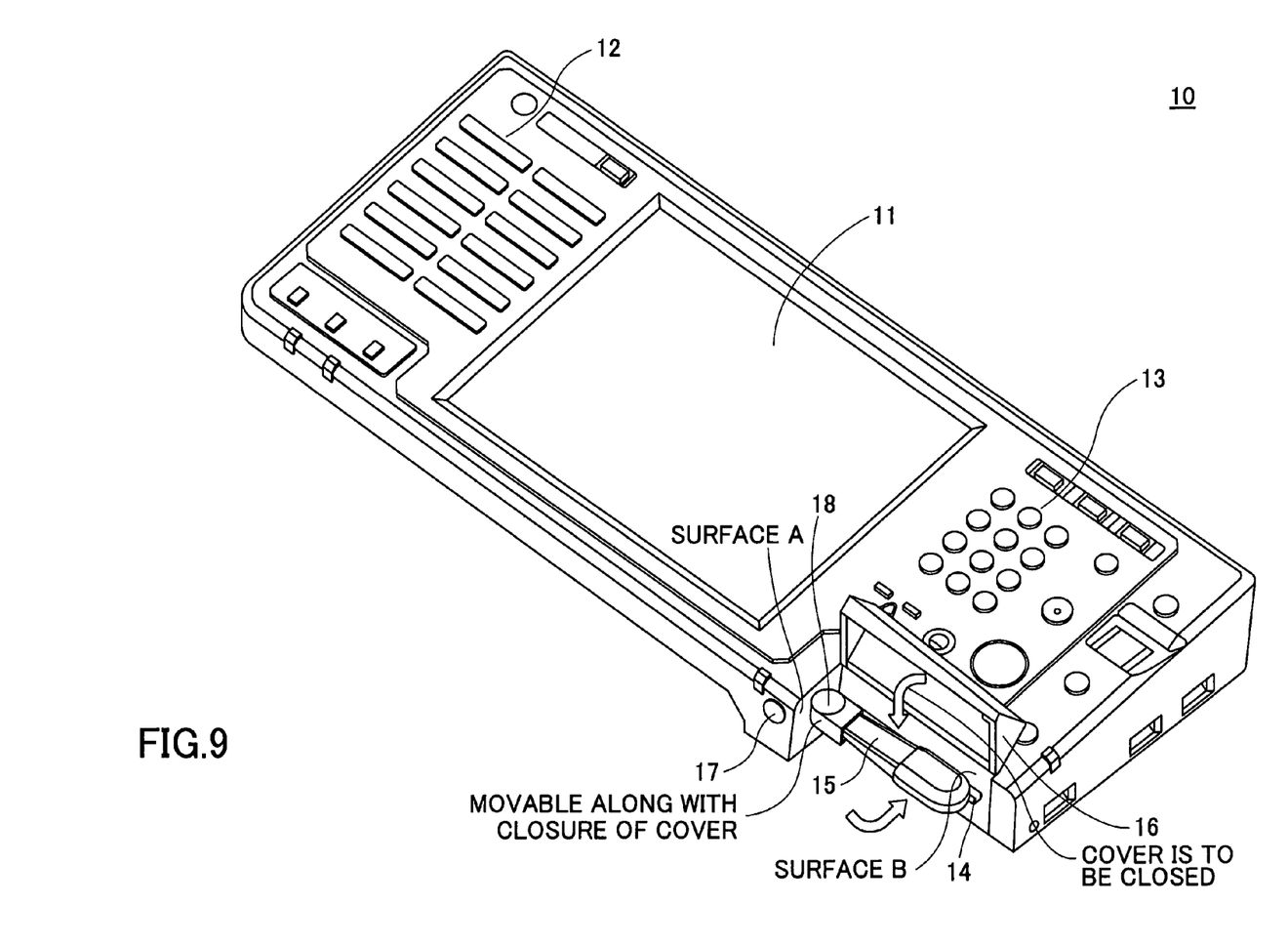
FIG. 9 is a diagram showing an example of a structure of an operation unit in an image processing device according to a fifth embodiment.
Figure 11:
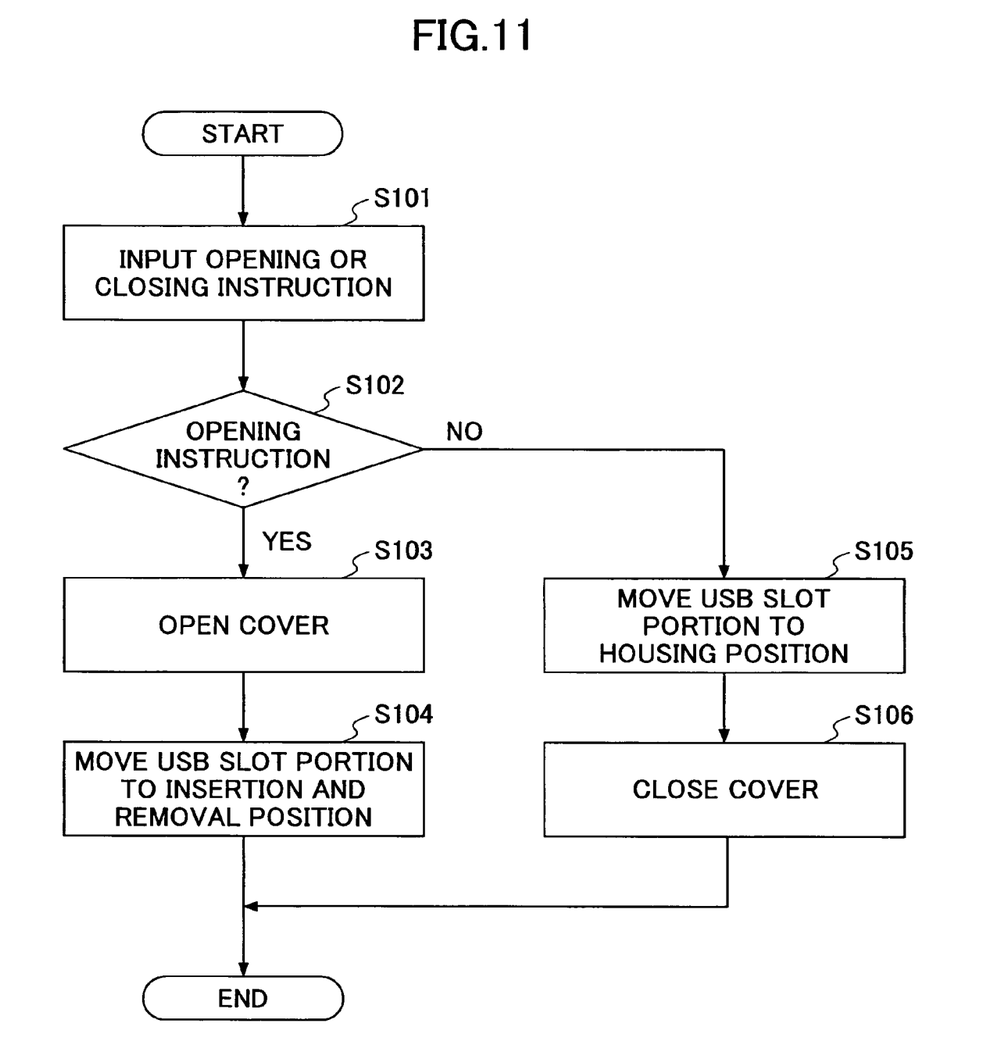
FIG. 11 is a diagram showing an example of an operational flow of an image processing device according to a fifth embodiment.

In the following, an image processing device according to a fifth embodiment is described with reference to FIGS. 9 and 11. An outline of the image processing device according to the fifth embodiment is the same as in the first embodiment, so that description thereof is omitted.

(Schematic Structure of the Operation Unit 10)

In the following, an example of the structure of the operation unit 10 in the image processing device according to the fifth embodiment is described with reference to FIGS. 9 and 11. FIG. 9 is a diagram showing the example of the structure of the operation unit 10 in the image processing device according to the fifth embodiment. In the above-mentioned fourth embodiment, the operation unit 10 includes the movable mechanism for allowing the movement of the USB memory slot portion 18. In the present embodiment, an example of the movable mechanism is moved in conjunction with opening and closing of the cover 16. A functional structure and an operational flow of the image processing device 1 for realizing the movement in conjunction are sequentially described with reference to FIGS. 10 and 11.

(Functional Structure)

Figure 10:
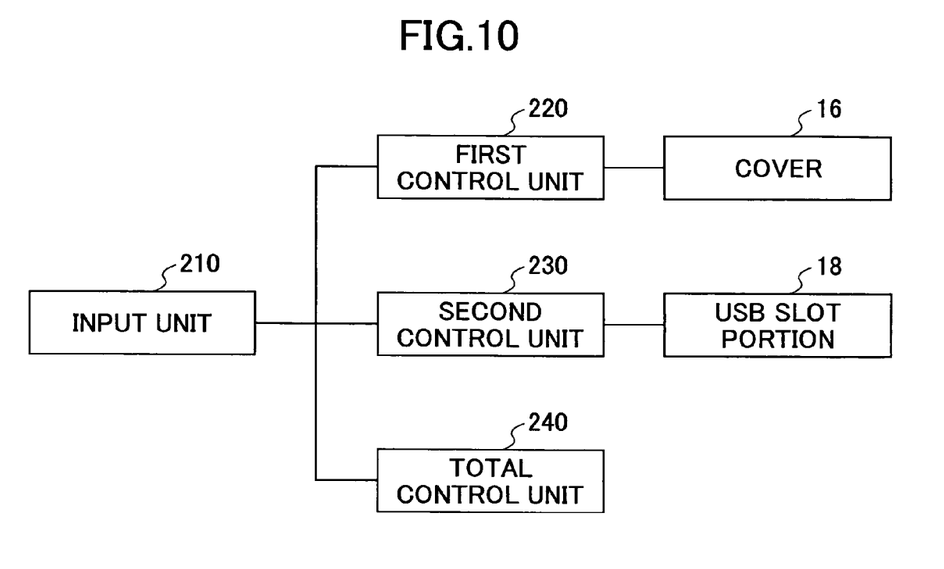
FIG. 10 is a diagram showing an example of a functional block diagram of an image processing device according to a fifth embodiment.

First, the functional structure for realizing the movement of the movable mechanism in conjunction with the opening and closing of the cover 16 is described with reference to FIG. 10. FIG. 10 is a diagram showing a functional block diagram of the image processing device according to the fifth embodiment. In FIG. 10, the image processing device 1 includes an input unit 210, first control unit 220, second control unit 230, and total control unit 240.

The input unit 210 inputs opening and closing instructions of the cover 16. Examples of the input unit 210 include the cover open button 17. The first control unit 220 controls opening and closing operations of the cover 16. The second control unit 230 controls operations of the movable mechanism. The total control unit 240 controls operations of the input unit 210, first control unit 220, second control unit 230, and the like. In accordance with the functional structure, in the image processing device 1 according to the fifth embodiment, the movable mechanism is moved in conjunction the opening and closing of the cover 16. An operation performed in conjunction is described in the following example of operation.

(Example of Operation)

Next, the example of operation in which the cover 16 is moved in conjunction with the opening and closing of the cover 16 is described with reference to FIG. 11. FIG. 11 is a diagram showing an operational flow of the image processing device 1 according to the fifth embodiment.

In the present embodiment, when the cover open button 17 is pressed by the user as the input unit 210, control is performed such that the cover 16 is automatically opened upon opening of the cover 16 and the USB memory slot portion 18 is moved to a predetermined position (where insertion and removal of the USB memory 15 can be readily made in this case) in a direction before the operation unit 10 in conjunction with the automatic opening of the cover 16. Moreover, upon closing of the cover 16, control is performed such that the USB memory slot portion 18 is moved to a housing position (where the USB memory 15 is housed in the concave portion) and the cover 16 is closed in conjunction with the movement of the USB memory slot portion 18.

The above-mentioned operation is described with reference to FIG. 11. First, the input unit 210 inputs an opening or closing instruction of the cover 16 by the user (S101). Next, the process proceeds to step S102 and the total control unit 240 judges whether an opening instruction is input based on the cover opening or closing instruction input by the input unit 210 (S102). If the input instruction is judged to be an opening instruction (YES, in S102), the process proceeds to step S103. If the input instruction is judged to be not an opening instruction (NO, in S102), the process proceeds to step S105.

When the process proceeds to step S103, the first control unit 220 performs control so as to open the cover 16 (S103). Then, the process proceeds to step S104 and the second control unit 230 operates the movable mechanism so as to control the USB memory slot portion 18 to move to the position (refer to FIG. 7) where insertion and removal of the USB memory 15 can be readily made (S104), thereby ending the process.

Figure 8:
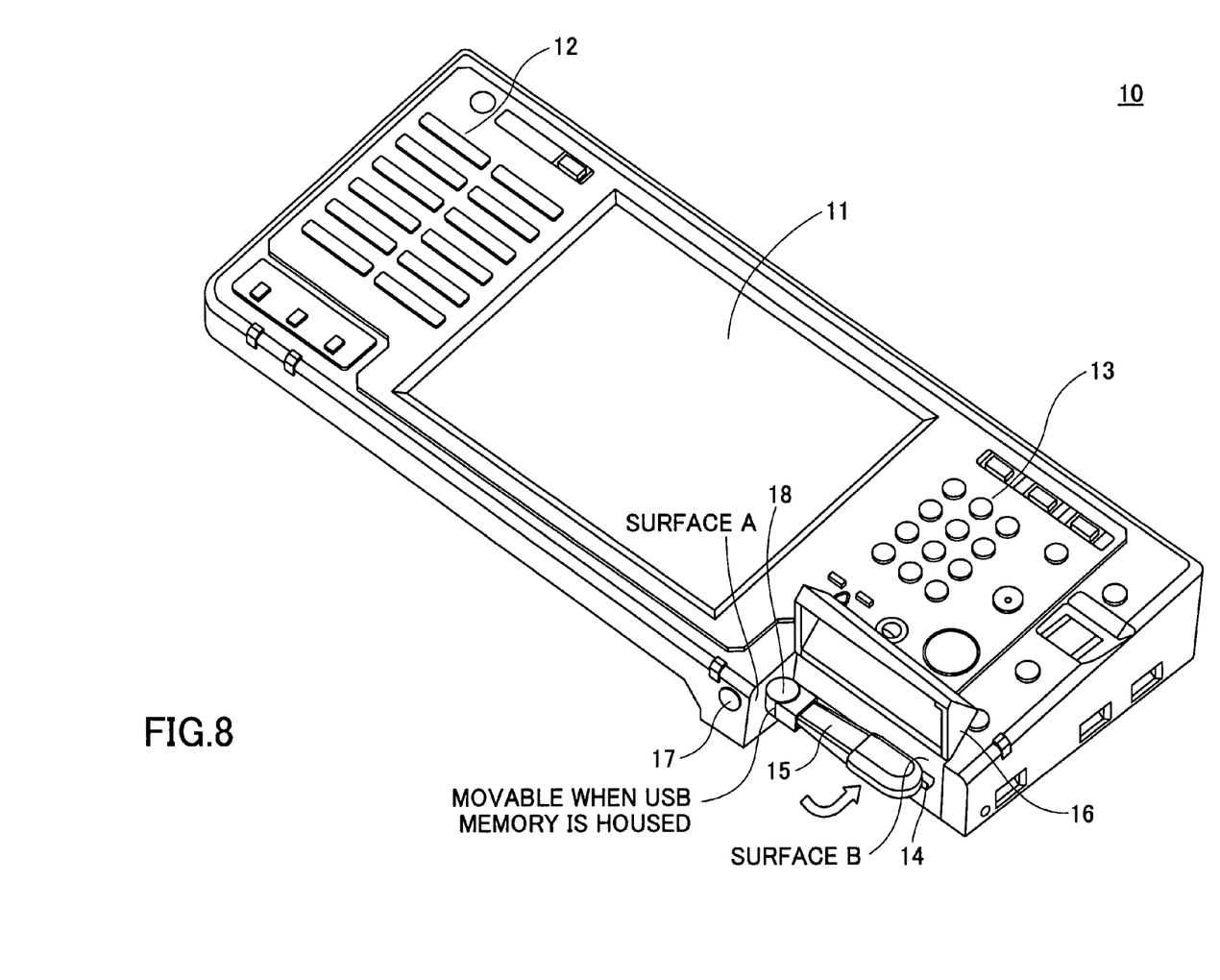
FIG. 8 is a diagram showing an example of operation of a movable mechanism in an image processing device according to a fourth embodiment.

When the process proceeds to step S105, the second control unit 230 operates the movable mechanism so as to control the USB memory slot portion 18 to move to the housing position (where the USB memory 15 is housed in the concave portion as shown in FIG. 8) (S105). Then, the process proceeds to step 106 and the first control unit 220 controls the cover 16 to be closed (S106), thereby ending the process.

In accordance with the above-mentioned operation, in the image processing device 1 according to the fifth embodiment, when the cover open button 17 is pressed by the user as the input unit 210, control is performed such that the cover 16 is automatically opened upon opening of the cover 16 and the USB memory slot portion 18 is moved to the predetermined position (where insertion and removal of the USB memory 15 can be readily made in this case) in the direction before the operation unit 10 in conjunction with the automatic opening of the cover 16. Moreover, upon closing of the cover 16, control is performed such that the USB memory slot portion 18 is moved to the housing position (where the USB memory 15 is housed in the concave portion) and the cover 16 is closed in conjunction with the movement of the USB memory slot portion 18.

In the image processing device 1 according to the above-mentioned fourth embodiment, although the USB memory slot portion 18 is movable, the user must manually move the USB memory slot portion 18 in the direction before the operation unit 10 when the USB memory is inserted or removed. By contrast, in the image processing device 1 according to the fifth embodiment, the cover 16 is automatically opened or closed where appropriate. In other words, the movement of the USB memory slot portion 18 is made in conjunction with the opening and closing of the cover 16, so that the user is not required to be aware of the movement, thereby improving the operability for the user.

In addition, when the user does not return the USB memory slot portion 18 to an inside of the cover 16 after the USB memory is inserted, the closure of the cover 16 is blocked. The USB memory is inserted or removed only while the cover 16 is opened, so that the movement of the USB memory slot portion 18 is preferably made in conjunction with the movement of the cover 16. Further, it is possible to apply the conjunctive operation between the USB memory slot portion 18 and the movable mechanism to the image processing device according to the third embodiment.

Sixth Embodiment

Figure 12:
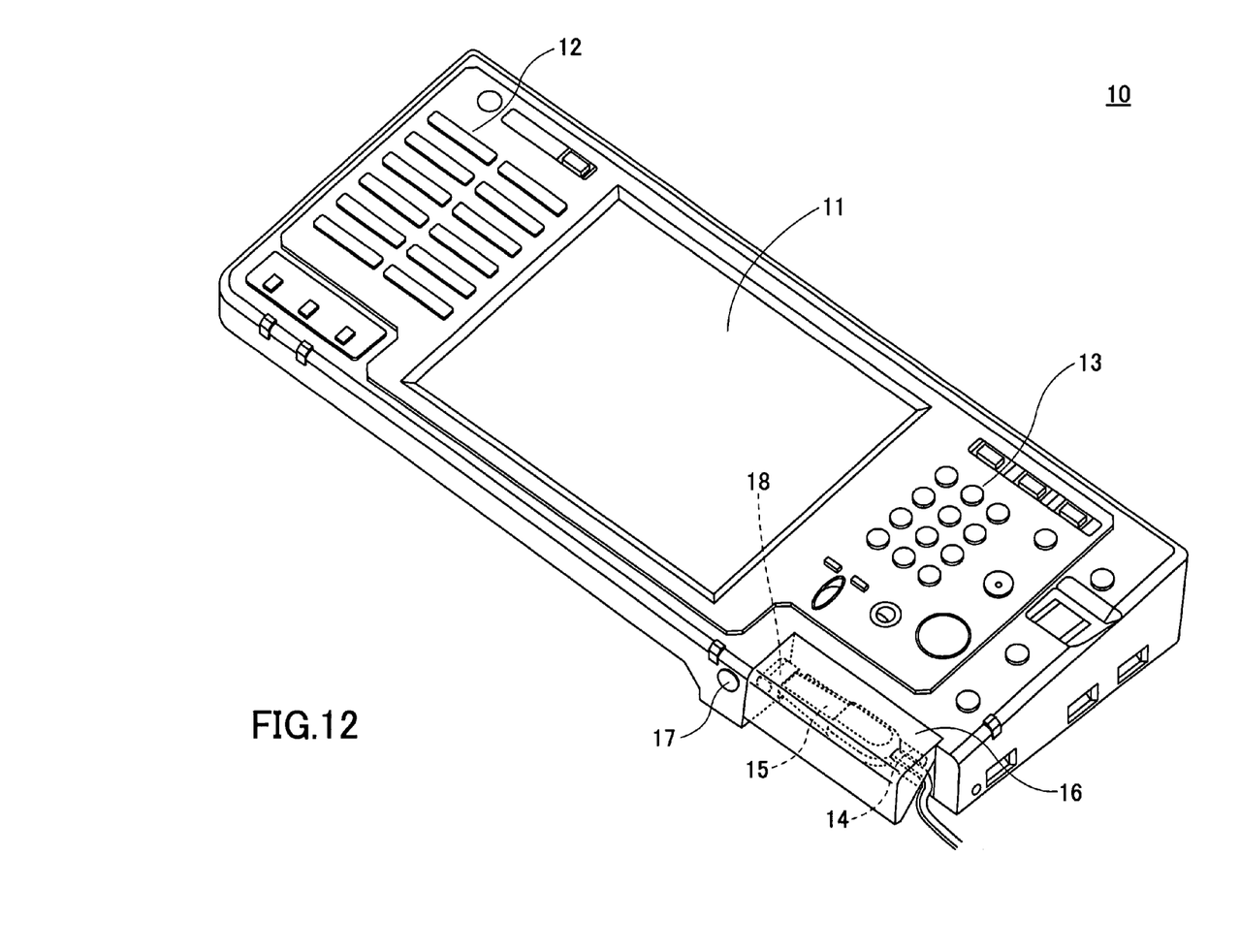
FIG. 12 is a diagram showing an example of a structure of an operation unit in an image processing device according to a sixth embodiment.

In the following, an image processing device according to a sixth embodiment is described with reference to FIG. 12. An outline of the image processing device according to the sixth embodiment is the same as in the first embodiment, so that description thereof is omitted. In the above-mentioned first to fifth embodiments, the cover 16 is configured to function as a protection cover for protecting storage media such as the USB memory 15 and the like. However, in some cases, a strap is attached to the USB memory 15. In this case, upon performing a data reading/writing process on the USB memory 15, namely, upon closing of the cover 16, the strap may not be housed in the cover 16 and the closure of the cover 16 may be blocked. In the present embodiment, by changing a shape of the cover 16 in accordance with a shape of the USB memory 15 as shown in FIG. 12, the operability for the user is further improved.

(Schematic Structure of the Operation Unit 10)

In the following, an example of the structure of the operation unit 10 in the image processing device according to the sixth embodiment is described with reference to FIG. 12. FIG. 12 is a diagram showing the example of the structure of the operation unit 10 in the image processing device according to the sixth embodiment. As shown in FIG. 12, a through-hole for a strap for the USB memory 15 is formed on the cover 16. In accordance with this, when a strap or the like is attached to the USB memory 15, the cover 16 is normally closed by passing the strap through the through-hole. When the data reading/writing process is performed on the USB memory 15 using detection of the closure of the cover 16 as a trigger, the process is performed without causing any failure.

In the sixth embodiment, the strap is attached to the USB memory 15. However, the shape of the cover 16 is not limited to this. Various shape patterns are considered for storage media such as the USB memory and the like in which an entire shape is not standardized. The shape of the cover 16 may be formed in accordance with the various shape patterns.

Although the present invention is described based on each of the embodiments, a range of application of the present invention is not limited to image processing devices such as MFP and the like. It is possible to apply the present invention to information processing devices such as PCs, home electric devices, vehicle navigation systems, gaming devices, and the like having a reader/writer unit for removable memory media so as to exchange information using removable memory media including protrusion type storage media such as the USB memory and the like in which a body of the storage medium externally protrudes upon use and insertion type storage media such as the SD card and the like in which a body of the storage medium is inserted upon use.

The present invention is not limited to the specifically disclosed embodiment, and variations and modifications may be made without departing from the scope of the present invention.

The present application is based on Japanese priority application No. 2006-352519 filed Dec. 27, 2006, the entire contents of which are hereby incorporated herein by reference.

What is claimed is:

1. An image processing device, comprising:
  a media connecting portion including a concave portion, the concave portion including a first surface and a second surface, the concave portion forming a space that houses therein a protrusion type storage medium whose body protrudes from the media connecting portion and an insertion type storage medium whose body is inserted into the media connecting portion;

a protrusion type slot portion for the protrusion type storage media on the first surface;

an insertion type slot portion for the insertion type storage media on the second surface, wherein
an insertion direction in the protrusion type slot portion is substantially orthogonal to an insertion direction in the insertion type slot portion;

an operation unit having at least one of a display and an operation key,
the media connecting portion being on the operation unit, and
the operation unit includes a movable mechanism for allowing movement of the protrusion type slot portion;

an input unit inputting opening and closing instructions of the protection cover;

a first control unit controlling opening and closing operations of a protection cover; and a second control unit controlling operations of the movable mechanism, wherein
when an instruction to open the protection cover is input by the input unit, the first control unit controls the protection cover to be in an open status and the second control unit controls the protrusion type slot portion for protrusion type storage media to move to a position where insertion and removal of the protrusion type storage media are readily made.

2. The image processing device according to claim 1, wherein the first surface is substantially orthogonal to the second surface.

3. The image processing device according to claim 1, further comprising:
a protection cover configured to protect the protrusion type storage medium and the insertion type storage medium, the protection cover being on the media connecting portion.

4. The image processing device according to claim 3, including:
a lock mechanism for locking the protection cover.

5. The image processing device according to claim 1, wherein
the movable mechanism turns the protrusion type slot portion in upward and downward directions relative to a horizontal direction on the first surface as a rotation axis.

6. The image processing device according to claim 1, wherein
the movable mechanism turns the protrusion type slot portion in a horizontal direction relative to a vertical direction on the first surface as a rotation axis.

7. The image processing device according to claim 1, wherein
when an instruction to close the protection cover is input by the input unit, the second control unit controls the protrusion type slot portion for protrusion type storage media to be housed in the media connecting portion and the first control unit controls the protection cover to be in a closed status.

8. An information processing device, comprising:
a media connecting portion including a concave portion, the concave portion including a first surface and a second surface, the concave portion forming a space that houses therein a protrusion type storage medium whose body protrudes from the media connecting portion and an insertion type storage medium whose body is inserted into the media connecting portion;

a protrusion type slot portion for protrusion type storage media on the first surface;

an insertion type slot portion for insertion type storage media on the second surface, wherein
an insertion direction in the protrusion type slot portion is substantially orthogonal to an insertion direction in the insertion type slot portion;

an operation unit having at least one of a display and an operation key,
the media connecting portion being on the operation unit, and
the operation unit includes a movable mechanism for allowing movement of the protrusion type slot portion;

an input unit inputting opening and closing instructions of the protection cover;

a first control unit controlling opening and closing operations of a protection cover; and a second control unit controlling operations of the movable mechanism, wherein
when an instruction to open the protection cover is input by the input unit, the first control unit controls the protection cover to be in an open status and the second control unit controls the protrusion type slot portion for protrusion type storage media to move to a position where insertion and removal of the protrusion type storage media are readily made.

9. The information processing device according to claim 8, wherein the first surface is substantially orthogonal to the second surface.

10. The information processing device according to claim 8, further comprising:
a protection cover configured to protect the protrusion type storage medium and the insertion type storage medium, the protection cover being on the media connecting portion.

11. The information processing device according to claim 10, including:
a lock mechanism for locking the protection cover.

12. The information processing device according to claim 8, wherein
the movable mechanism turns the protrusion type slot portion in upward and downward directions relative to a horizontal direction on the first surface as a rotation axis.

13. The information processing device according to claim 8, wherein
the movable mechanism turns the protrusion type slot portion in a horizontal direction relative to a vertical direction on the first surface as a rotation axis.

14. The information processing device according to claim 8, wherein
when an instruction to close the protection cover is input by the input unit, the second control unit controls the protrusion type slot portion for protrusion type storage media to be housed in the media connecting portion and the first control unit controls the protection cover to be in a closed status.

* * * * *